United States Patent [19]

Kato et al.

[11] Patent Number: 4,641,151

[45] Date of Patent: Feb. 3, 1987

[54] THERMAL TRANSFER RECORDING APPARATUS

[75] Inventors: Shigeru Kato; Naomi Osada, both of Yokohama; Toshikatsu Ichitoh, Kawasaki; Masae Murata, Yamato; Masfumi Mochizuki, Sagamihara, all of Japan

[73] Assignee: Victor Company of Japan, Limited, Yokohama, Japan

[21] Appl. No.: 813,440

[22] Filed: Dec. 26, 1985

[30] Foreign Application Priority Data

Dec. 28, 1984 [JP] Japan ................................ 59-274566
Dec. 28, 1984 [JP] Japan ........................... 59-196618[U]

[51] Int. Cl.4 ............................................ G01D 15/10
[52] U.S. Cl. ............................... 346/76 PH; 346/105; 346/139 R; 400/120; 400/356
[58] Field of Search .............. 346/76 PH, 105, 139 R; 400/120, 356; 219/216 PH

[56] References Cited

U.S. PATENT DOCUMENTS 4,531,132 7/1985 Wilkinson ...................... 346/76 PH

*Primary Examiner*—Arthur G. Evans
*Attorney, Agent, or Firm*—Jordan and Hamburg

[57] ABSTRACT

A device associated with a thermal transfer recording apparatus for boosting a pressing force of a thermal head against a platen roller. The thermal head is mounted on one end portion of an elongate support plate which is movable in a seesaw motion about a fulcrum. Output torque of a rotary solenoid device is transmitted to the support plate by a rotary shaft which is connected to the solenoid device, so that the support plate is moved about the fulcrum to press the head against the platen. During recording, an extra drive force is derived from a tension of an ink sheet and imparted via the rotary shaft to the support plate to move the support plate, serving to further intensify the pressing force of the head against the platen.

7 Claims, 5 Drawing Figures

THERMAL TRANSFER RECORDING APPARATUS

BACKGROUND OF THE INVENTION

The present invention relates to a thermal transfer recording apparatus and, more particularly, to a thermal transfer recording apparatus which allows a thermal head to press on a platen roller, through ink and printing sheets interposed in between, with increased intensity by means of a simple mechanism and, yet, enhances fast movements of the thermal head into and out of the vicinity of the platen roller.

As well known in the art, thermal transfer recording is effected by causing an ink sheet which is provided with an ink layer on one surface thereof and a recording sheet into contact, then pressing a thermal head against the other surface of the ink sheet, and then applying a current to selected ones of heating resistors of the thermal head to heat the head. The heat of the head melts the ink on the ink sheet to transfer it to the recording sheet.

A prior art apparatus for such thermal transfer recording includes a platen roller, a thermal head, a support plate adapted to support the thermal head at one end thereof and pivotally movable about a fulcrum to bring the head into and out of the vicinity of the platen roller, and a pull-type solenoid device having a plunger, a drive shaft, which is connected to the other end of the support plate and directly reciprocated to move the support plate in the above-mentioned manner. The head is brought into the vicinity of the platen roller by the pull-type solenoid device and driven away from the platen roller by a spring.

As described above, movements of the head into and out of pressing contact with the platen roller with the sheets interposed in between have customarily been implemented with the pull-type solenoid mounted on one end of the head support plate, which is movable in a seesaw motion, and the spring. The problem with this prior art apparatus is that when the solenoid device is actuated to press the head against the platen roller, the spring counteracts the solenoid device. Specifically, the head fails to press on the platen roller with sufficient pressure (which should generally to about 10 kilograms) unless the support plate is dimensioned longer between the fulcrum and the head than between the fulcrum and the drive shaft of the solenoid device or a large-scale pull-type solenoid device is used. This makes the whole apparatus bulky and aggravates power consumption.

Another problem with the prior art apparatus is that since the release of the head from the platen roller is effected by the spring which is anchored to the support plate, a substantial period of time is necessary for the head from being moved clear of the platen roller after the solenoid device is deenergized, that is, rapid release of the head is unattainable. In addition, such a slow escapement of the head away from the platen roller increases a chance of head collision with the platen roller at its protruding paper cramp.

SUMMARY OF THE INVENTION

It is therefore an object of the present invention to provide a thermal transfer recording apparatus which allows a thermal head to press forward a platen roller with an optimum force.

It is another object of the present invention to provide a thermal transfer recording apparatus which boosts the pressing force of a thermal head against a platen roller by means of a simple mechanism.

It is another object of the present invention to provide a thermal transfer recording apparatus which moves a thermal head rapidly into and out of a vicinity of a platen roller.

It is another object of the present invention to provide a generally improved thermal transfer recording apparatus.

A thermal transfer recording apparatus for recording information in a recording sheet by means of an ink sheet which is interposed between a platen roller and a thermal head of the present invention comprises a head support plate carrying the thermal head at one end portion thereof and pivotally movable in a seesaw motion about a fulcrum which is located between the one end portion and an other end of the head support plate, a rotary solenoid device for generating a drive force which causes the support plate to move about the fulcrum, and a pressing device for pressing the thermal head against the platen roller by transmitting the drive force generated by the rotary solenoid device to the head support plate to move the head support plate about the fulcrum.

In accordance with the present invention, a device associated with a thermal transfer recording apparatus for boosting a pressing force of a thermal head against a platen roller is provided. The thermal head is mounted on one end portion of an elongate support plate which is movable in a seesaw motion about a fulcrum. Output torque of a rotary solenoid device is transmitted to the support plate by a rotary shaft which is connected to the solenoid device, so that the support plate is moved about the fulcrum to press the head against the platen. During recording, an extra drive force is derived from a tension of an ink sheet and imparted via the rotary shaft to the support plate to move the support plate, serving to futher intensify the pressing force of the head against the platen.

The above and other objects, features and advantages of the present invention will become more apparent from the following detailed description taken with the accompanying drawings.

DESCRIPTION OF THE PREFERRED EMBODIMENT

While the thermal transfer recording apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
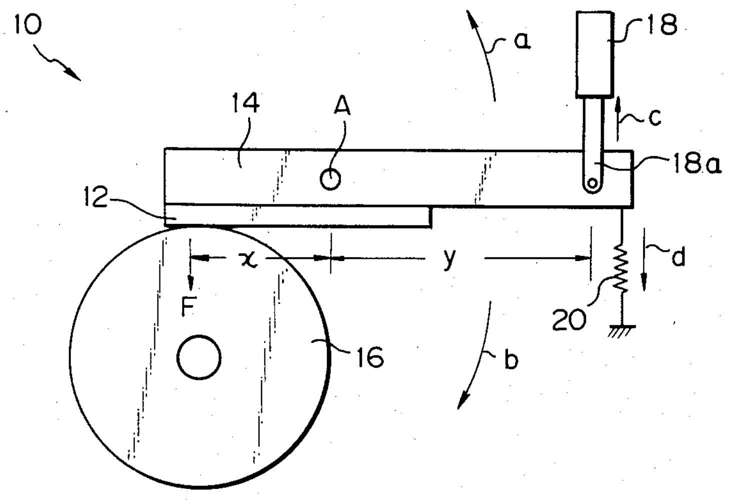
Fig. 1 PRIOR ART
FIG. 1 is a fragmentary sectional side elevation of a prior art thermal transfer recording apparatus.

To facilitate an understanding of the present invention, motions of a thermal head toward and away from a platen roller in a prior art thermal transfer recording apparatus will be analyzed referring to FIG. 1.

As shown in FIG. 1, a prior art thermal transfer recording apparatus 10 includes a thermal head 12 which is mounted on the underside of a support plate 14 adjacent to a platen roller 16. The support plate 14 is pivotally movable about a fulcrum A in opposite directions as indicated by arrows a and b. A pull-type solenoid device 18 having a plunger, or drive shaft, 18*a* is connected to an end portion of the support plate 14 which is remote from the head 12, the drive shaft 18*a* being pulled upwardly when the solenoid device 18 is energized. Also connected to this end portion of the solenoid device 18 is a spring 20 which constantly biases the support plate 14 downwardly. When the solenoid device 18 is energized, the plunger 18*a* is pulled upwardly as indicated by an arrow c causing the support plate 14 to move in the direction a about the fulcrum A. As a result, the head 12 is brought into pressing contact with the platen roller 16 through ink and printing sheets with a predetermined force. When the solenoid device 18 is deenergized, the spring 20 which exerts a tensile force in a direction indicated by an arrow d causes the support plate 14 to move in the direction b, thereby releasing the head 12 from the platen roller 16.

In this manner, the prior art apparatus uses the solenoid device 18 connected to one end of the support plate 14 and the spring 20 for pressing the head 12 against and releasing it from the platen roller 16. In this situation, the force of the spring 20 undesirably offsets that of the solenoid device 18 when the latter is exerted to bring the head 12 toward the platen roller 16. To insure a sufficient pressing force of the head 12 against the roller 16, therefore, either one of two implementations has to be employed, i.e., designing the length x of the support plate 14 between the fulcrum A and the head 12 greater than the length y between the fulcrum A and the point where the plunger 18*a* of the solenoid device 18 is connected, and using a large-scale solenoid device 18. Since it is the spring 20 anchored to the support plate 14 that releases the head 12 from the platen roller 16, the head 12 takes a substantial period of time to become clear of the platen roller 16 after the solenoid 18 has been deenergized, resulting in a slow release motion.

Figure 2:
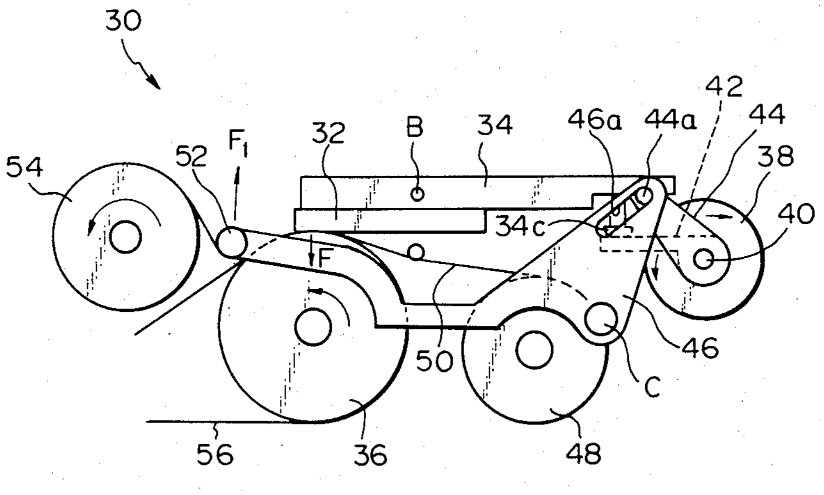
FIG. 2 is a fragmentary side elevation of a thermal transfer recording apparatus embodying the present invention.
Figure 3:
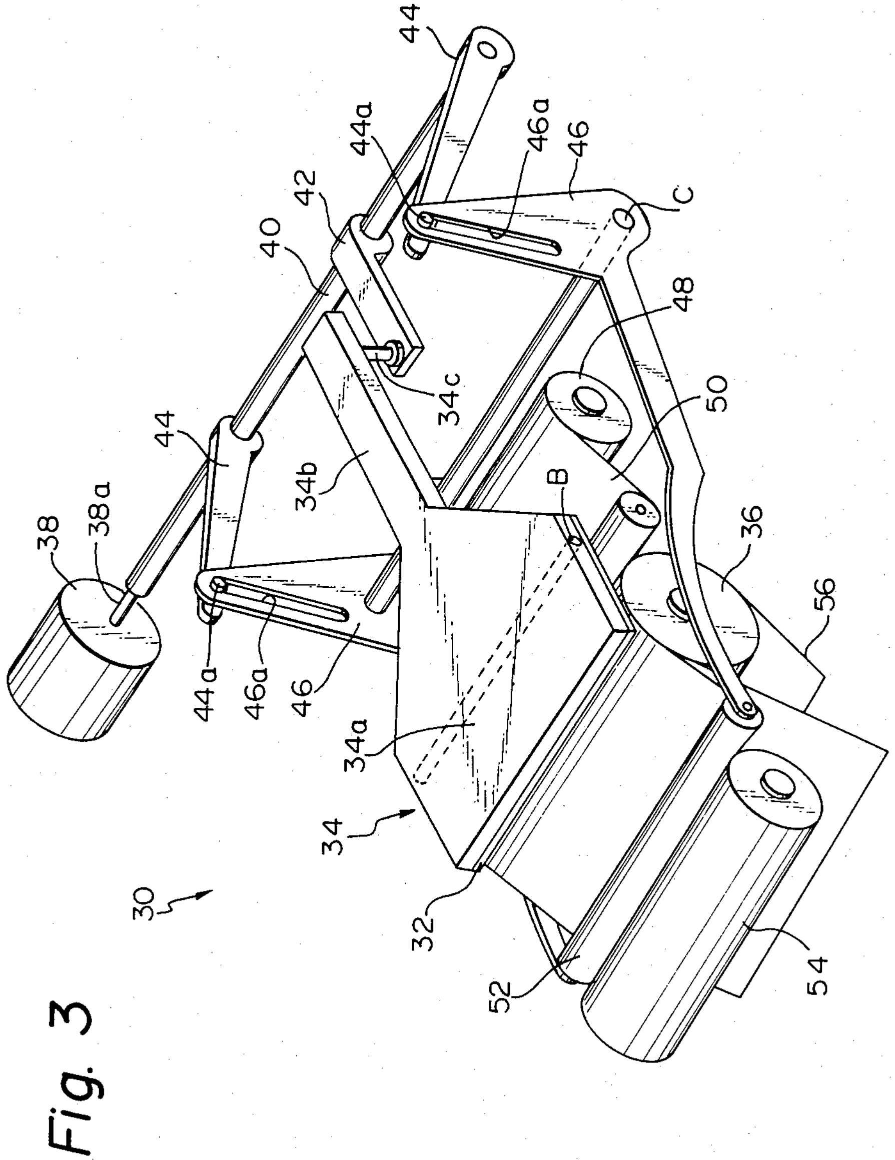
FIG. 3 is a perspective view of the recording apparatus of FIG. 2.

Referring to FIGS. 2 and 3, a thermal transfer recording apparatus embodying the present invention which is free from the above-discussed drawbacks is shown. The apparatus, generally 30, includes a thermal head 32 which is mounted on a support plate 34. As shown in FIG. 3, the support plate 34 has a first portion 34*a* and a second portion 34*b* which is narrower than the first portion 34*a*. The support plate 34 is movable in a seesaw motion about a fulcrum B. A platen roller 36 is made of an elastic material such as rubber and located below the thermal head 32. A rotary solenoid 38 which accommodates a spring therein has a rotary plunger 38*a* to which a rotary shaft 40 is connected. The rotary-type solenoid device is smaller in size than the pull-type solenoid device used with the prior art apparatus and, yet, produces a considerable torque which insures sufficient pressure of the head 32 with the platen roller 36. A first cam 42 is mounted on the rotary shaft 40, while a pin 34*c* extends downwardly from the other end of the support plate 34. The upper surface of the free end of the first cam 42 faces the lower end of the pin 34*c*.

Figure 4:
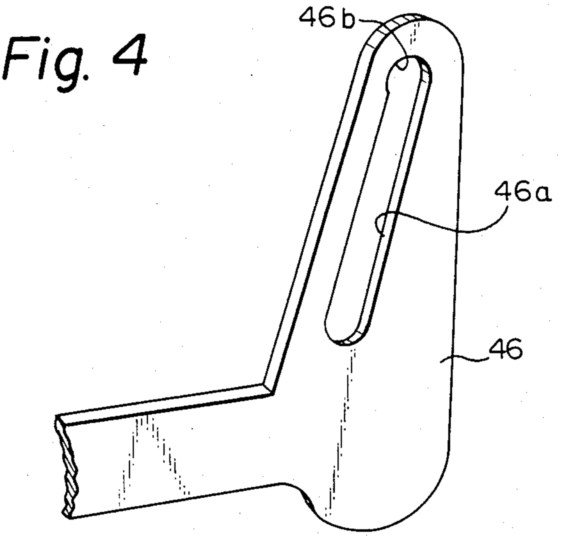
FIG. 4 is an enlarged view of a flat member which is included in the recording apparatus of FIGS. 2 and 3 and provided with a slot.

Alternatively, the pin 34*c* may be provided on the first cam 42 which is fixed to the rotary shaft 40, or a roller may be provided on the free end of the pin 34*c* which is not fixed in place. A pair of spaced second cams 44 are also mounted on the rotary shaft 40. Pins 44*a* are each studded in the free end of the second cam 44 and movably received in a slot 46*a* which is formed through a flat member 46. A separator roller 52 is supported by one end of the flat members 46 in order to separate an ink sheet 50 which is dispensed from an ink sheet roller 48. The reference numeral 54 designates an ink sheet take-up roller, and 56 a recording sheet. A symbol C designates the center of rotation of the flat members 46. The slots 46*a* of the flat members 46 allow one to freely move the support plate 34 or the flat member 46 to thereby raise the thermal head 32 away from the platen 36 or release the roller 52 from the ink sheet 50 in the event of, for example, replacement of the ink sheet 50. As shown in FIG. 4, the slots 46*a* each merge into a slightly enlarged portion 46*b* at the upper end which is complementary in configuration to the pin 44*a*.

Figure 5:
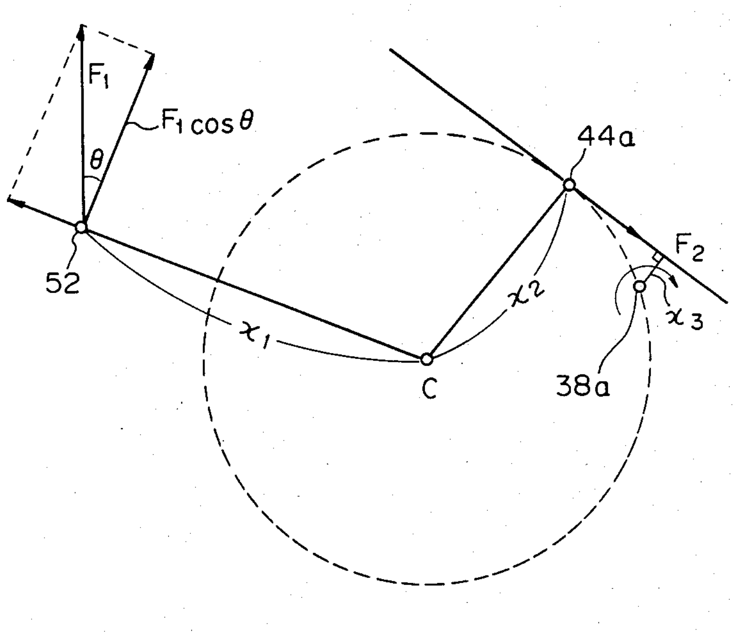
FIG. 5 is a diagram representative of the operation of a second cam also included in the recording apparatus of FIGS. 2 and 3.

As shown in FIG. 5, assume a circle having a radius which is defined by a line interconnecting the center of the pin 44*a* on any of the second cams 44 and the center of rotation C of the flat members 46, and with center at the center of rotation C. In this particular embodiment, a line tangential to such a circle at the position of the pin 44*a* is located above the center of the rotary shaft 38*a*.

In operation, the first cam 42 which is rotated by the rotary solenoid device 38 raises the adjacent end of the support plate 34 and, thereby, causes the thermal head 32 into pressing toward with the platen roller 36. In such a construction, even if the support plate 34 has the same dimensions as that of the prior art apparatus in both of its extensions at opposite sides of the center of rotation B of its own, the thermal head 32 is capable of pressing toward the platen roller 36 with a stronger force than in the prior art apparatus. In the illustrative embodiment, the second cams 44 which are also mounted on the rotary shaft 40 serve as another source of pressure force which urges the head 32 against the platen roller 56 as explained infra. Specifically, while the first cam 42 is rotated to hold the head 32 in pressing against the platen roller 36, the second cams 44 are also rotated to cause the head 32 to further strongly press against the platen roller 36.

In detail, a force $F_1$ is imparted by the tension of the ink sheet 50 upwardly to the separator roller 52 which is separating the ink sheet 50. In this condition, as shown in FIG. 5, a torque $x_1F_1 \cos \theta$ is developed about the center of rotation C of the flat member 46 with the result that a force $F_2 = x_1/x_2 \cdot F_1 \cos \theta$ acts on the second cams 44. At this instant, the vector of the force $F_2$ which acts on the pins 44*a* on the second cams 44 assumes a position on a circle having a radius which is defined by a line interconnecting the centers of the pins 44*a* and the center of rotation C of the flat members 46 and with center at the center of rotation C, and above the center of the rotatable plunger 38*a*. Therefore, the force acting on the pins 44*a* acts on the rotary shaft 40, which is associated with the solenoid device 38, with a torque $F_2 \cdot x_3$ and in the clockwise direction as viewed in FIG. 2.

In the above situation, the torque acting on the shaft 40 also acts on the first cam 42 so that the force F which the first cam 42 exerts on the head 32 toward the platen roller 36 is intensified. In the case where the diameter of the ink sheet rolled on the take-up roller 54 is relatively small or where the tension of the ink sheet 50 is relatively weak, the force $F_1$ and, therefore, the torque developing about the center of rotation C of the flat members 46 will correspondingly be reduced to in turn reduce the pressing force of the head 32 against the platen roller 36.

To release the head 32 from the platen roller 36, a power supply associated with the solenoid device 38 is turned off. Then, the spring which is installed in the solenoid device 38 restores the first cam 42 to its original or inoperative position via the plunger 38*a* and shaft 40. This causes that part of the support plate 34 which is connected with the first cam 42 to be pulled downwardly and, thereby, the other part which carries the head 32 therewith upwardly about the fulcrum B. In this manner, the thermal head 32 is rapidly moved clear of the platen roller 36.

In summary, it will be seen that the present invention provides a thermal transfer recording apparatus which with an extremely simple construction allows a thermal head to be pressed strongly against a platen roller. The simplicity of construction translates into a low production cost. The whole apparatus is small size and light weight and consumes a minimum of power. In addition, when a power supply is turned off, the head is immediately released from the platen roller to enhance stability and reliability of operation.

Various modifications will become possible for those skilled in the art after receiving the teachings of the present disclosure without departing from the scope thereof.

What is claimed is:

1. A thermal transfer recording apparatus for recording information on a recording sheet by means of an ink sheet which is interposed between the recording sheet wrapped around a platen roller and a thermal head, comprising:

a head support plate carrying the thermal head at one end portion thereof and pivotally movable in a seesaw motion about a fulcrum which is located between said one end portion and another end portion of said head support plate;

a rotary solenoid device for generating a drive force;

a first pressing means for pressing the thermal head against the platen roller by transmitting the drive force generated by said rotary solenoid device to the head support plate to move the head support plate about the fulcrum; and second pressing means subjected to the tension of the ink sheet during recording for intensifying the pressing force of the head against the platen by transmitting an additional drive force, which is related to the tension of the ink sheet, to the head support plate via the first pressing means.

2. A thermal transfer recording apparatus as claimed in claim 1, wherein the head support plate has a width which is greater at one end portion than at the other end portion of the head support plate.

3. A thermal transfer recording apparatus as claimed in claim 1, wherein said first pressing means applies the output drive force of the rotary solenoid to said other end portion of the head support plate to move the head support plate about the fulcrum.

4. A thermal transfer recording apparatus as claimed in claim 1, wherein said second pressing means further comprises a roller means engaging said ink sheet, said second pressing means being operable to transmit the tension applied to said roller means by said ink sheet to urge pivoting of said support plate about said fulcrum to thereby apply an additional pressing force of the head support plate against the platen.

5. A thermal transfer recording apparatus as claimed in claim 1, wherein the first pressing means comprises a rotary shaft connected to a rotary plunger of the rotary solenoid device and a first cam rigidly mounted on said rotary shaft, a pin being studded in the other end portion of the head support plate to be engaged with said first cam.

6. A thermal transfer recording apparatus as claimed in claim 5, wherein the second pressing means comprises a pair of second cams which are each rigidly mounted on the rotary shaft at one end thereof, a pair of elongate flat members operatively linked one with each of said second cams and pivotally movable about a fulcrum, and an ink sheet separator roller rotatably supported by one end of the flat members.

7. A thermal transfer recording apparatus as claimed in claim 6, wherein each of the flat members is formed with an elongate slot through the other end portion thereof, each of the second cams being provided with a pin which is movably received in said slot of the flat member associated with said second cam.

* * * * *